United States Patent
Bauwer et al.

(10) Patent No.: US 12,437,245 B2
(45) Date of Patent: Oct. 7, 2025

(54) SEAT-ASSIGNMENT BASED RESOURCE TRACKING

(71) Applicant: Microsoft Technology Licensing, LLC, Redmond, WA (US)

(72) Inventors: Wilco Gerardus Bernardus Bauwer, Renton, WA (US); Eduardo Javier Leal Tostado, Redmond, WA (US); Jagdish Singh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 17/737,309

(22) Filed: May 5, 2022

(65) Prior Publication Data
US 2023/0359951 A1 Nov. 9, 2023

(51) Int. Cl.
*G06Q 10/0631* (2023.01)

(52) U.S. Cl.
CPC ................ *G06Q 10/0631* (2013.01)

(58) Field of Classification Search
None
See application file for complete search history.

(56) References Cited

U.S. PATENT DOCUMENTS

| | | | | |
|---|---|---|---|---|
| 7,562,369 B1 * | 7/2009 | Salamone | ............... | H04L 67/34 719/331 |
| 9,645,840 B2 * | 5/2017 | Ennaji | ................. | G06F 9/45533 |
| 2009/0124375 A1 * | 5/2009 | Patel | ..................... | G07F 17/32 463/29 |
| 2010/0228679 A1 * | 9/2010 | Scapa | ..................... | G06F 21/10 705/310 |
| 2013/0159021 A1 * | 6/2013 | Felsher | .................. | G16H 10/60 705/3 |
| 2014/0280931 A1 * | 9/2014 | Braun | ................... | H04L 63/104 709/225 |
| 2014/0280932 A1 | 9/2014 | Braun et al. | | |
| 2016/0149910 A1 * | 5/2016 | Luque | .................. | H04L 63/061 713/171 |
| 2017/0109506 A1 * | 4/2017 | Shetty | ..................... | G06F 16/13 |

(Continued)

FOREIGN PATENT DOCUMENTS

WO  WO-2020037208 A1 *  2/2020  ........... G06F 21/105

OTHER PUBLICATIONS

H.-H. Wang, J.-C. Chen and Z.-N. Liu, "Resource allocation in central-controlled Device-to-Device communications networks," 2013 IEEE Global Communications Conference (Globecom), Atlanta, GA, USA, 2013, pp. 4871-4876 (Year: 2013).*

(Continued)

*Primary Examiner* — Jerry O'Connor
*Assistant Examiner* — Philip N Warner
(74) *Attorney, Agent, or Firm* — Barta Jones, PLLC

(57) ABSTRACT

Seat-assignment based resource tracking is used to track usage, or consumption, of resources under a license. An account includes a license for a plurality of resources. An allotment is generated under the account and populated with a plurality of seats. Populating the allotment with the plurality of seats automatically authorizes the populated plurality of seats for access to a portion of the plurality of resources. When the plurality of resources are accessed by a device associated with a seat of the authorized plurality of seats, the usage of the plurality of resources by the device is tracked.

20 Claims, 9 Drawing Sheets

(56) References Cited

U.S. PATENT DOCUMENTS

| | | | |
|---|---|---|---|
| 2017/0111289 A1* | 4/2017 | Cropper | G06F 11/00 |
| 2018/0145955 A1* | 5/2018 | Nirwal | H04L 63/068 |
| 2019/0164242 A1* | 5/2019 | Zhang | G06Q 50/184 |
| 2020/0162463 A1 | 5/2020 | Dykstra et al. | |
| 2020/0322324 A1* | 10/2020 | Chang | G06F 9/54 |
| 2020/0358784 A1* | 11/2020 | Khaund | H04L 9/3239 |
| 2021/0081404 A1* | 3/2021 | Kempf | G06F 16/2379 |
| 2021/0342194 A1* | 11/2021 | Zhang | G06F 9/5038 |
| 2022/0286299 A1* | 9/2022 | Manevich | H04L 9/3239 |
| 2022/0337445 A1* | 10/2022 | Dillon | H04L 12/2898 |
| 2022/0360608 A1* | 11/2022 | Raleigh | H04L 47/2408 |
| 2022/0400368 A1* | 12/2022 | Karia | H04M 15/48 |
| 2023/0195858 A1* | 6/2023 | Shah | G06F 21/10 726/27 |

OTHER PUBLICATIONS

"International Search Report and Written Opinion Issued in PCT Application No. PCT/US2023/013559", Mailed Date: Jun. 1, 2023, 10 Pages.

* cited by examiner

SEAT-ASSIGNMENT BASED RESOURCE TRACKING

BACKGROUND

Subscriptions for a particular resource are traditionally tracked based on consumption of the resource. For example, a suite of resources included in a single subscription typically follows consumption-based modeling. In other words, as resources are deployed, an account holder is charged for the usage of the resources. However, some organizational structures include the different usage models for different groups. These groups in an organization may include frequent turnover, which presents challenges from traditional consumption-based resource tracking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods that tracking resources under a license. The methods include generating an account, the account including a license for a plurality of resources, generating at least one allotment under the account, populating the allotment with a plurality of seats, automatically authorizing the populated plurality of seats for access to a portion of the plurality of resources, and, in response to the portion of the plurality of resources being accessed by a device associated with a seat of the authorized plurality of seats, tracking usage of the plurality of resources by the device.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 9, the systems are illustrated as schematic drawings. The drawings may not be to scale.

DETAILED DESCRIPTION

Figure 1:
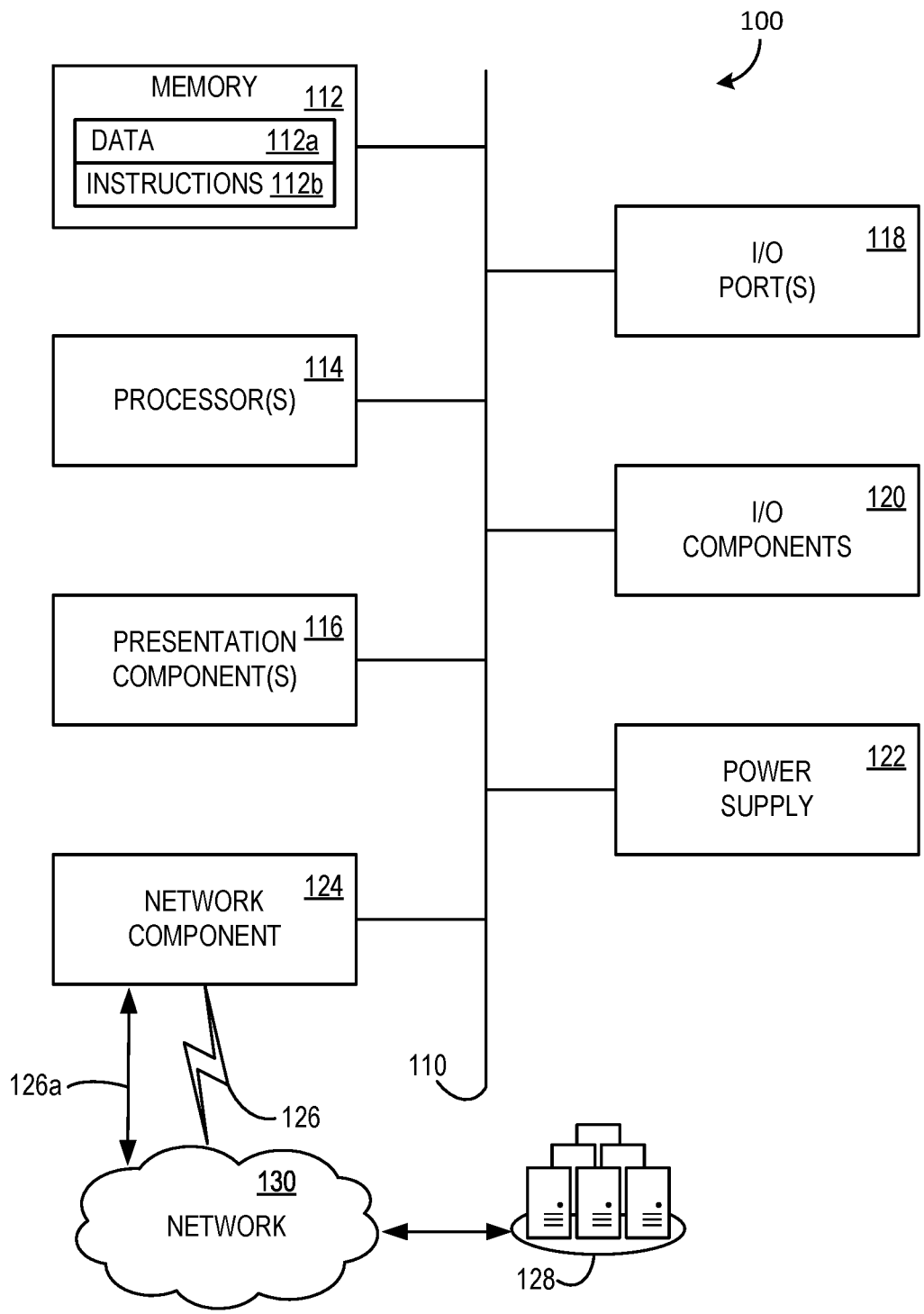
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, resourced-based consumption presents challenges for resource tracking. In particular, in conventional resource-based consumption there is no affinity between the usage of resources and a user who is using the resources. Resource-based consumption further fails to provide effective mechanisms for adding, modifying, or removing authorization for a particular user or a particular device. For example, when resource-based consumption is deployed, usage is merely tracked, reported, and charged, without an integrated model that may easily add or revoke permissions to use the resources on a user- or device-specific level due to the lack of affinity between the usage and the user.

The present disclosure addresses these deficiencies by providing a new dimension to resource tracking that tracks resources and usage based on assigned seats to selected users, which may include an individual, a device, and/or a set of devices. In particular, the assignments of users and/or security principles drive the provisioning further downstream into workloads. In other words, by assigning users to an allotment within an account while following security principles, the workload and consumption of resources by the user is more precisely managed and tracked, which provides more accurate results regarding which resources have been consumed and by whom.

To accomplish this, an account may include one or more allotments. Each allotment may include a specific selection of users, or devices, for whom a workload is authorized, referred to herein as seats. The workload may include the authorized services. Usage of services within the workload is monitored and tracked under the allotment, providing a more robust tracking of resources within specific the allotments of the account. The implementation of the allotment model within an account enables users to be added to the allotment, removed from the allotment, have workloads modified within the allotment, and so forth such that the authorization of the user is automatically updated, more effectively tracking resource usage and managing user accounts within the allotment.

As referenced herein, a seat, or user, within an allotment may include one or more of an individual, a device, a set of devices. Where a seat is an individual, the individual may access the resources via one or more electronic devices through an authorization process. For example, the individual may enter a username and password, or use other authentication means such as biometrics, to access a particular resource on a particular electronic device. The present disclosure contemplates that the individual may enter the username and password to access the resource on more than one electronic device. The usage of the resource on multiple devices may be considered usage under the same seat in the allotment. Where a seat is a device, the device may be an electronic device, such as the computing device 102 and/or the system 200, that is utilized by an individual and identified as a device in the particular allotment. In some examples, the device is identified by the authentication means used to log in to the device. In other examples, the device is identified via an internet protocol (IP) address registered in the allotment. Where a seat is referred to as a set of devices, the set of devices may include one or more electronic devices, such as the computing device 102 and/or the system 200, that are utilized by an individual or individuals and identified as one of the devices in the particular allotment.

Accordingly, the present application provides improved systems and methods for resource tracking. By implementing an assignment-based tracking model, usage of resources are more reliably tracked and allotments including assignments for different resources and resource packages may be more efficiently added, modified, or deleted. Accordingly, resources are managed more effectively by being able to track usage for particular licenses or accounts, add seats to a license, modify privileges of a user within an account, and revoke a seat's access to resources on a license.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif, ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 may be implemented as one or more electronic devices such as servers, laptop computers, desktop computers, mobile electronic devices, wearable devices, tablets, and so forth. The computing device 100 may be implemented as a system 200 as described in greater detail below.

Figure 2:
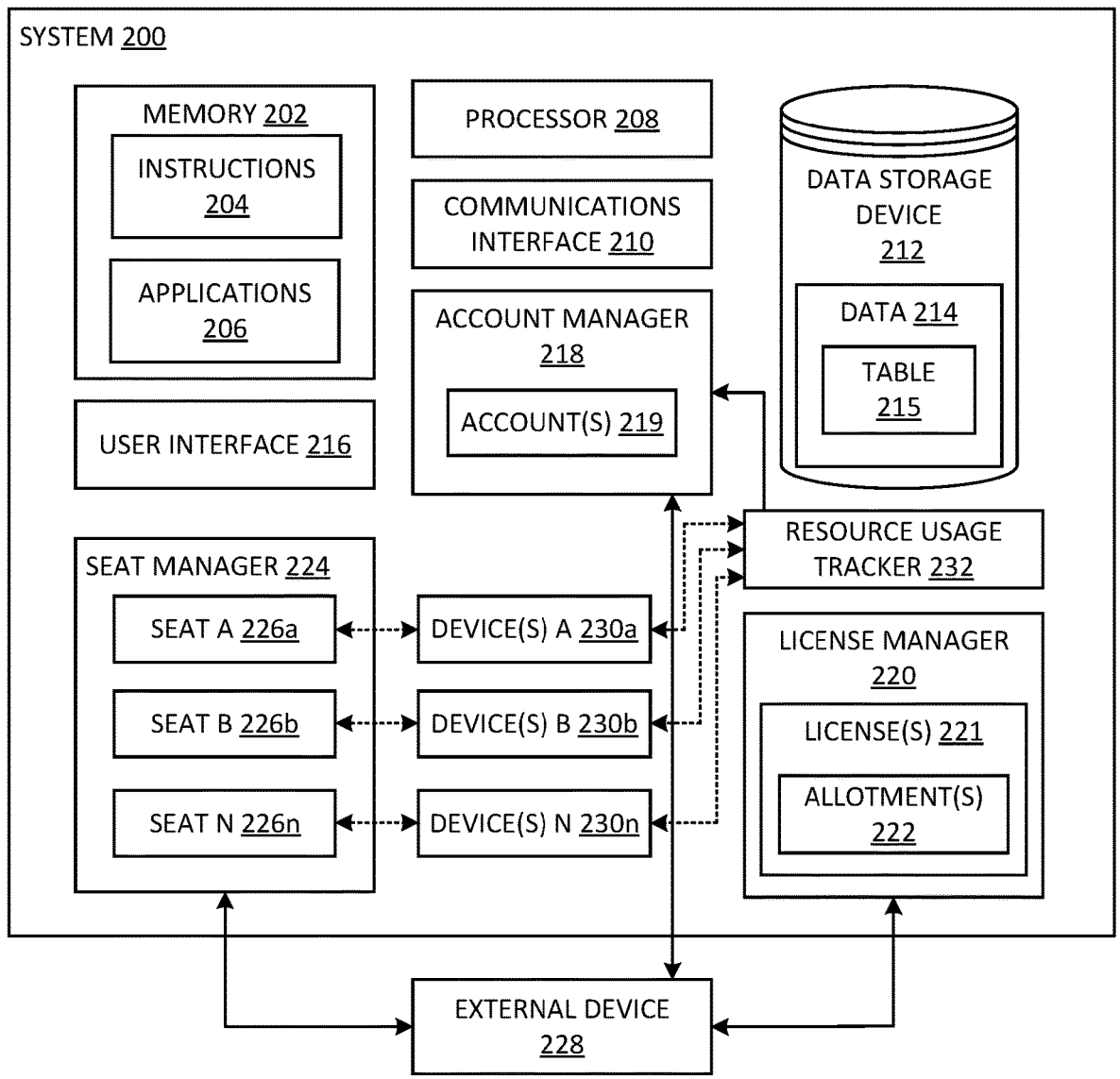
FIG. 2 is a block diagram illustrating an example system for seat-assignment based resource tracking for implementing various examples of the present disclosure.

FIG. 2 is a block diagram illustrating an example system for seat-assignment based resource tracking for implementing various examples of the present disclosure. The system 200 may include the computing device 100. In some implementations, the system 200 includes a cloud-implemented server that includes each of the components of the system 200 described herein. In some implementations, the system 200 is presented as a single computing device that contains each of the components of the system 200.

The system 200 includes a memory 202, a processor 208, a communications interface 210, a data storage device 212, a user interface 216, an account manager 218, a license manager 220, and a seat manager 224. The memory 202 stores instructions 204 executed by the processor 208 to control the communications interface 210, the user interface 216, the account manager 218, the license manager 220, and the seat manager 224. The memory 202 further stores data, such as one or more applications 206. An application 206 is a program designed to carry out a specific task on the system 200. For example, the applications 206 may include, but are not limited to, drawing applications, paint applications, web browser applications, messaging applications, navigation/mapping applications, word processing applications, game applications, an application store, applications included in a suite of productivity applications such as calendar applications, instant messaging applications, document storage applications, video and/or audio call applications, and so forth, and specialized applications for a particular system 200. The applications 206 may communicate with counterpart applications or services, such as web services.

The processor 208 executes the instructions 204 stored on the memory 202 to perform various functions of the system 200. For example, the processor 208 controls the communications interface 210 to transmit and receive various signals and data, controls the data storage device 212 to store particular data 214, and controls the user interface 216 to display one or more client-side versions of the applications 206. In some implementations, the processor 208 executes the instructions 204 stored on the memory 202 to perform functions of one or more of the account manager 218, the license manager 220, and the seat manager 224 as described herein.

The data storage device 212 stores data 214. The data 214 may include any data, including data related to accounts 219 managed by the account manager 218, licenses 221 managed by the license manager 220, and seats managed by the seat manager 224. For example, as described in greater detail below, the account manager 218 manages one or more accounts 219, each of which include one or more licenses 221 managed by the license manager 220. One or more of the licenses 221 include an allotment 222, which include one or more seats 226, such as the seat A 226a, seat B 226b, and the seat N 226n, managed by the seat manager 224. In some examples, the data 214 includes a dynamic table 215 corresponding to each allotment 222, as described in greater detail below.

The account manager 218 is implemented on the processor 208 and generates and manages one or more accounts 219. In some implementations, an account 219 is a subscription account for a subscription including a suite of services, or resources. The account 219 may be generated by registering an individual, organization, group, and so forth with a provider of the subscription. For example, the subscription may be an educational account, such as an account that includes allotments 222 according to one or more classes, each including one or more students. In another example, the subscription may be another organizational account that includes allotments 222 according to one or more departments, each including one or more employees.

The license manager 220 is implemented on the processor 208 and manages one or more licenses 221 of the one or more accounts 219. For example, an account 219 may include one or more licenses 221 for the subscription to the account 219. In example where the subscription is an educational account, each class may have a separate license 221. In the example where the subscription is an organizational account, each department may have a separate license 221. The license 221 may include an allocation of resource availability that may be consumed by one or more devices, described in greater detail below.

In some examples, the license 221 may represent a legal and/or commercial license. In other examples, the license 221 may represent an unlimited license, such as a license enabling an administrator to assign an unlimited number of seats 226 as described herein. The unlimited license may not automatically expire at a particular time and either seats or devices need to be removed from a tenant, the assignment needs to be removed manually, or the allotment/license needs to be deleted manually in order to stop the access to and/or consumption of resources.

In some implementations, the license 221 is a license to access and use resources for a particular subscription. For example, where the account 219 is an educational account, the license 221 may be a license for a subscription to class materials, educational software, storage accounts in which to store assignments and course work, and so forth. In another example, where the account 219 is an organization account, the license 221 may be a license for a subscription to a suite of software, including but not limited to email software, document storage software, word processing software, presentation software, spreadsheets software, note taking software, calendar management software, videoconferencing software, and so forth. In various examples, the license 221 may be a license for resources, instead of or in addition to those previously described, including a cloud storage account, a virtual machine (VM), and so forth.

In some implementations, each license 221 includes one or more allotments 222. An allotment 222 is used to organize one of more seats 226 managed by the seat manager 224. In some implementations, the allotment 222 is generated and managed by the license manager 220 as part of managing the one or more licenses 221 within the one or more accounts 219. In some implementations, the allotment 222 is generated and/or managed by a user. For example, the user may add seats 226 to the allotment 222, remove seats 226 from the allotment 222, modify permissions of one or more seats 226 in the allotment 222, and so forth. The user may generate and/or manage the allotment 222 using an external device 228.

The license manager 220 manages the access of each seat 226 to the material under the umbrella of the license 221. For example, the license manager 220 populates the one or more allotments 222 with one or more seats 226. In some examples, each allotment 222 includes a customized version of the materials included in the license 221 accessible to the seats 226 included in the allotment 222. For example, where the license 221 is the subscription to educational materials, the license manager 220 generates an allotment 222 corresponding to each class. As part of generating the allotment 222, the license manager 220 populates the allotment 222 with one or more seats 226 and specifies which materials are available to the seats 226 included in the allotment 222. For example, an allotment 222 corresponding to a first class will have materials available corresponding to the first class, while another allotment 222 corresponding to a second class will have materials available corresponding to the second class. Accordingly, an affinity is established between the allotment, the resources available to the allotment, and the seats included in the allotment that access and consume the resources.

In another example, where the license 221 is a subscription to a suite of software for an organization, the license manager 220 generates an allotment 222 corresponding to each department and specifies which materials are available to the seats 226 included in the allotment 222. For example, an allotment 222 corresponding to an accounting department may include access to accounting software, while an allotment 222 corresponding to a legal department may not include access to the accounting software but does include access to legal research software. Accordingly, the license manager 220 generates customized allotments 222 based on one or more of the type of the license 221, the subscription the license 221 is for, who or what the particular seats 226 in the allotment 222 refer to, and so forth.

The seat manager 224 is implemented on the processor 208 and manages the permissions of the one or seats within the one or more allotments 222. For example, the seat manager 224 authorizes seat A 226a, seat B 226b, and seat N 226n to use at least a portion of the resources included in the license 221. Although illustrated in FIG. 2 as including three devices, the seat manager 224 may manage any number of seats 226 within the allotment 222. The allotment 222 may include any number of seats 226 without departing from the scope of the disclosure. For example, the allotment 222 may include ten seats, twenty seats, fifty seats, one hundred seats, or more seats.

As referenced herein, each seat 226 refers to an individual or a device included in the allotment 222. For example, each seat 226 may be a particular device specified as within the allotment 222. In another example, where the account 219 is an educational account and the allotment 222 refers to a particular class, each seat 226 may refer to a student in the class. In yet another example, where the account 219 is an organizational account and the allotment 222 refers to a particular department, each seat 226 may refer to an employee, independent contractor, intern, and so forth in the particular department. Each seat 226 may be associated with a particular device or set of devices 230 that the seat uses to utilize resources under the umbrella of the license 221. For example, the seat A 226a may be associated with one or more devices A 230a, the seat B 226b may be associated with one or more device B 230b, and the seat N 226n may be associated with one or more device N 230n. Each of the devices 230 may include one or more electronic devices, but for simplicity is illustrated in FIG. 2 as one or more devices 230. For example, seat A 226a may refer to a student in a class. The student may use multiple devices 230, such as a mobile electronic device and a laptop, on which they utilize resources that fall under the umbrella of the license 221. In this example, seat B 226*b* refers to another student in the class, but this student may only use a single device 230, such as a laptop, to utilize resources that fall under the umbrella of the license 221. Accordingly, various examples of seats 226 and devices 230 are possible.

The associations between the seats 226 and devices 230 may be stored as data within the system 200, such as the data 214. For example, the data 214 may include the dynamic table 215 that associates, for each seat 226 within the allotment 222, the device or devices 230 registered to the seat 226. In some implementations, each device 230 is identified within the table 215 by a device type, such as laptop, mobile electronic device, and so forth, by an internet protocol (IP) address, or any other suitable method of identifying a device 230. The table 215 may be generated and maintained by the license manager 220 upon populating of the allotment 222. The table 215 may be updated in real-time as seats 226 are added to, removed from, or modified within the allotment 222 or as devices 230 are added to, removed from, or modified within the allotment 222 corresponding to the seat 226. In one example, the table 215 is updated to include a new device 230 when a user signs in to the new device 230 using a username and password specific to the seat 226.

The external device 228 is an electronic device that communicates with one or more of the account manager 218, the license manager 220, and the seat manager 224. For example, the external device 228 may be one or more of a server, laptop computer, desktop computer, mobile electronic device, wearable device, tablet, or other electronic device used to communicate with the components of the system 200. In some examples, the external device 228 is connected to the system 200 via a network, such as a cloud-connected network. In other examples, the external device 228 is included within the system 200.

In some implementations, the external device 228 is an administrator device that communicates with one or more of the account manager 218, license manager 220, and the seat manager 224. For example, the external device 228 may provide instructions to the account manager 218 regarding the accounts 219, such as which accounts 219 are to have allotments 222 generated. The external device 228 may provide instructions to the license manager 220 regarding details of the allotments 222 to be generated, such as which seats 226, how many seats 226, and so forth to be included in each allotment 222. The external device 228 may receive information from the seat manager 224 regarding the devices 230 associated with each respective seat 226. The external device 228 may further provide instructions to authenticate or not authenticate particular devices 230 and to add, remove, or modify seats 226 included in a particular allotment 222. For example, the external device 228 may provide instructions to add a seat 226 to the allotment 222, remove a seat 226 from the allotment 222, or change the access permitted for a particular seat 226 in the allotment 222.

The resource usage tracker 232 is implemented on the processor 208 and tracks usage of the resources provided via the license 221. In some examples, the resource usage tracker 232 tracks usage, or consumption, of the resources provided via the license 221 and accessed and utilized by the one or more devices 230. For example, the external device 228 includes the seat A 226*a* within the allotment 222 and identifies which of the resources included in the license 221 the seat A 226*a* is authorized to access and utilize. The external device 228 may authorize all of the resources within the license 221 or only some of the resources within the license 221. In some examples, the authorization for the resources changes over time. For example, authorization to some resources may be revoked or additional resources may be authorized.

Accordingly, the resource usage tracker 232 tracks not only the overall usage and consumption of resources provided by the license 221, but also the context of the consumption. The resource usage tracker 232 tracks which device 230 consumes the resource and associates the device 230 with a particular seat 226 using the dynamic table 215 stored in the data storage device 212. For example, when a user corresponding to a seat 226 logs into a device 230 and begins consuming resources, the resource usage tracker 232 is able to identify the IP address of the device 230, find the identified IP address within the table 215, identify the seat 226 associated with the IP address, and tag the consumption of the resource as consumption by the particular seat 226. In another example, the resource usage tracker 232 identifies the means of authentication when a seat 226 logs into the device and begins consuming resources, finds the username and password or biometric data within the table 215, identify the seat 226 associated with the authentication data, and tag the consumption of the resource as consumption by the particular seat 226. Because the allotment 222 including the seat 226 is known, the consumption is automatically attributed to the appropriate allotment 222 based on the identification of the seat 226.

In some examples, the consumption data captured by the resource usage tracker 232 is converted to billing charges. For example, account manager 218 may receive the consumption data obtained by the resource usage tracker 232 and generate a bill including charges based at least on the usage of the resources included in the license 221. In some examples, the received consumption data and billed charges may be utilized in order to encourage the optimization of the resources. For example, the bill may include the application of discount instruments when utilization patterns are applied. For example, when utilization and consumption is high for a particular allotment 222, the account manager 218 may offer or automatically implement a billing structure that charges a one-time upfront fee for consumption in line with the particular allotment 222 with charges for additional usage, rather than a billing structure that charges strictly based on consumption.

As the consumption of the resources provided via the license 221 are tracked, the resource usage tracker 232 subtracts the tracked consumption from the allocation of resource availability. For example, the allocation may be a predetermined allocation of storage space, data usage, and so forth that is consumed in accessing and utilizing the resources. The license 221 may include the predetermined allocation for a set price per account 219, per license 221, per allotment 222, or per seat 226. In some implementations, where the allocation is reached, the resources may be restricted from additional use. In some implementations, additional allocation may be purchased for an additional cost.

Figure 3:
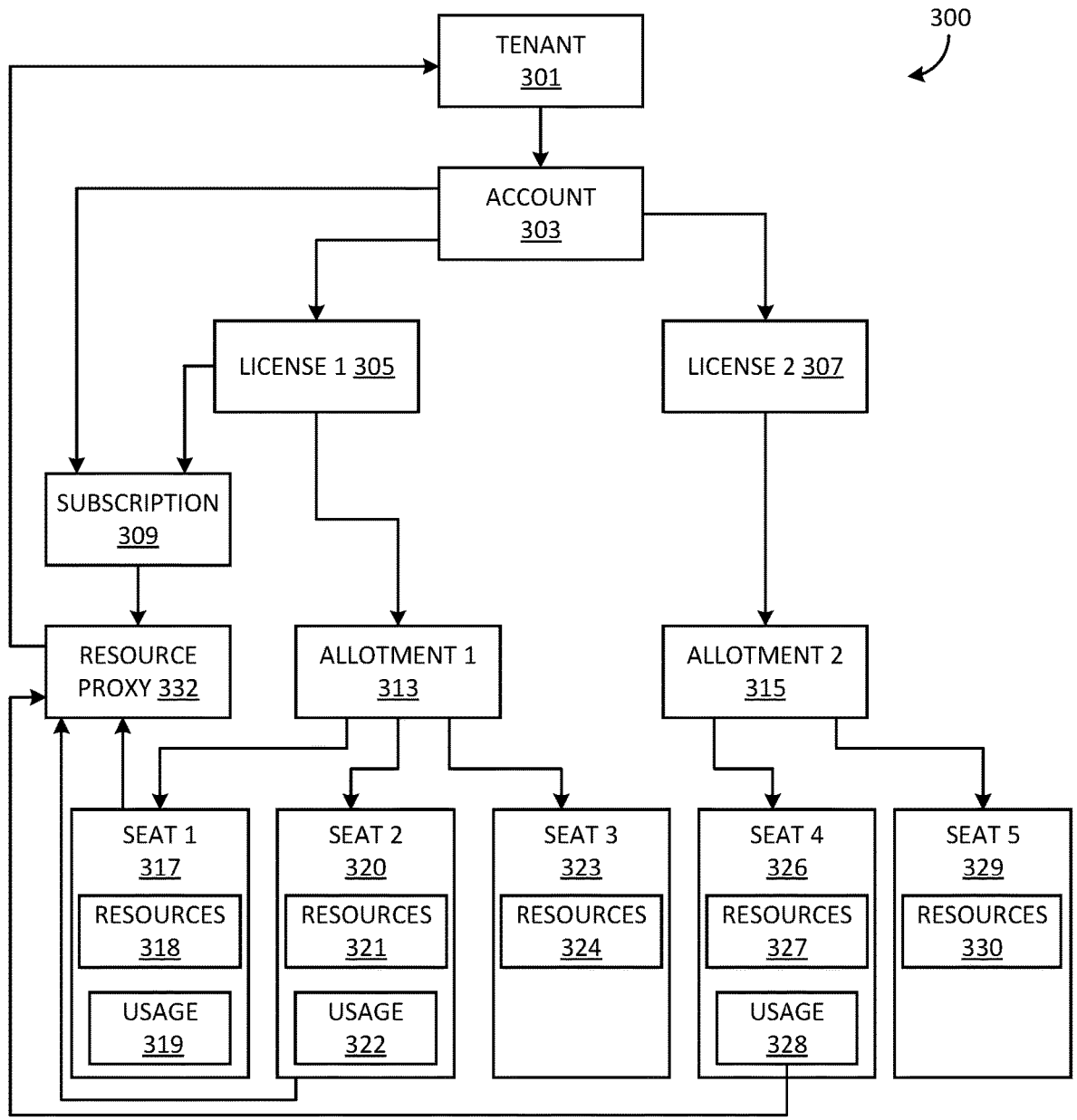
FIG. 3 is block diagram illustrating an example architecture for seat-assignment based resource tracking for implementing various examples of the present disclosure.

FIG. 3 is block diagram illustrating an example architecture for seat-assignment based resource tracking for implementing various examples of the present disclosure. The block diagram 300 is for illustration only and should not be construed as limiting. In some implementations, one or more components of the block diagram 300 include one or more components of the system 200.

The block diagram 300 illustrates an example of seat-assignment based consumption tracking according to various examples. The block diagram 300 includes a tenant 301. The tenant 301 includes a system or a computing device upon which a resource or a suite of resources is housed. For example, the tenant 301 may be a server or group of servers that stores the resources, information regarding licenses provided for access to the resources, and so forth. In some examples, the tenant 301 illustrated in the block diagram 300 represents an individual or organization that owns the rights to the resources and grants a license to another individual or organization to access the resources in exchange for payment. Payment may be made to the tenant 301 based on consumption of the resources, based on access to the resource, and so forth.

The block diagram 300 further includes an account 303. In some examples, the account 303 is an example of the account 219. The account 303 may be a subscription account for a subscription to the resources, or services, owned and/or licensed by the tenant 301. The account 303 is owned or operated by an individual or an organization that receives a license to access the resources owned by the tenant 301. The account 303 may include one or more licenses, such as the first license 305 and the second license 307. Each of the first license 305 and the second license 307 may be examples of the license 221. In some implementations, the first license 305 and the second license 307 include licenses to the same resources owned by the tenant 301. For example, a particular license may include a cap on the number of users, seats, etc. that may access the resources included in the license, so an organization may require more than one license for the entire organization. As another example, for billing, accounting, resource tracking, and so forth, an organization may choose to purchase more than one license to be used to access the resources.

In other implementations, the first license 305 includes a license to resources owned by the tenant 301 that the second license 307 does not include and/or the second license 307 includes a license to resources owned by the tenant 301 that the first license 305 does not include. For example, the organization may include different licenses that include different selections of resources. The organization may include an accounting department, which receives the first license 305, which includes a suite of resources that include accounting software, and a legal department, which receives the second license 307, which includes a suite of resources that include legal research software.

Each of the first license 305 and the second license 307 include a subscription. For example, the first license 305 includes a subscription 309. The subscription 309 is the mechanism by which the first license 305 receives access to the resources owned by the tenant 301. In some examples, the subscription 309 is a resource-based subscription and is accessed by the respective seats through a resource proxy 332.

Each of the first license 305 and the second license 307 include at least one allotment. For example, the first license 305 includes a first allotment 313 and the second license 307 includes a second allotment 315. Each of the allotments 313, 315 may be examples of the allotments 222. Although each of the first license 305 and the second license 307 are illustrated in FIG. 3 as including one allotment, various examples are possible. Each of the first license 305 and the second license 307 may include one allotment or more than one allotment without departing from the scope of the present disclosure.

At the time the allotments 313, 315 are generated, the allotments 313, 315 are populated with one or more seats 317, 320, 323, 326, 329 which are used to access and use the resources of the account according to assigned security principles. Each of the seats 317, 320, 323, 326, 329 may be an example of the seat 226 described herein. For example, the security principles include which users and/or devices are authorized to access which resources of the respective license 305, 307. For example, within the first allotment 313, the first seat 317 and the second seat 320 may have access to different resources within the first license 305, different authorized consumption levels of the resources within the first license 305, and so forth.

In some implementations, the first allotment 313 is associated with a first organizational department and the seats are users, such as employees, of the resources within the department. For example, the first allotment 313 includes a first seat 317, a second seat 320, and a third seat 325. The first seat 317 may be a first user in the first department, the second seat 320 may be a second user in the first department, and the third seat 325 may be a third user in the first department. Likewise, the second allotment 315 is associated with a second organizational department and the seats are users, such as employees, of the resources with the second department. The second organizational department may be a different department than the first organizational department within the same organization. The second allotment 315 includes a fourth seat 326 and a fifth seat 329. The fourth seat 326 may be a first user in the second department and the fifth seat 329 may be a second user in the second department. It should be understood that a user may be an employee, an independent contractor, a student, a device, or any other person or device authorized to utilize the resources under the respective license. Further, a department in an organization may also refer to a department, a group of departments, a class, or a group of classes within an educational system as described herein. An allotment may include any number of seats without departing from the scope of the present disclosure.

As each seat within an allotment accesses and utilizes the resources, consumption of the resources is tracked. For example, the first seat 317 accesses a version of the resource 318 and usage 319 is tracked and reported to a resource proxy 332, the second seat 320 accesses a version of the resource 321 and usage 322 is tracked and reported to the resource proxy 332, and the fourth seat 326 accesses a version of the resource 327 and usage 328 is tracked and reported to the resource proxy 332. In some examples, each version of the resource is a locally installed version of the resource that is accessible based on registration of a valid license. In other examples, each version of the resource is a cloud-based version of the resource that is accessible based on registration of a valid license. As shown in the block diagram 300, the third seat 323 and the fifth seat 329 have access to a version of the resource 324 and resource 330, respectively, but do not report usage data. In some examples, this is because although the resources are available, the resources are not accessed and therefore no usage is present to be tracked.

The resource proxy 332 receives usage, or consumption, data from one or more seats. The resource proxy 332 processes the received usage data and reports the usage data to the tenant 301. Thus, the resource proxy 332 provides an implicit linkage from the seats and resources to the subscription 309 because only a single deployment of the resource proxy 332 is available under the tenant 301. Based on the received usage data, the tenant 301 may generate a bill for the usage of the resources. The generated bill is sent to the account 303 for payment. In some examples, the usage data is billed through the subscription 309 to the account 303.

As illustrated in FIG. 3, resource-based workloads may be bridged to an assignment-based workload by including the subscription 309 and the resource proxy 332. However, the example of seat-assignment based consumption tracking illustrated in FIG. 3 comes with a loss of fidelity when reporting consumption because the subscription 309 is the same per workload across all assigned seats. In other words, no distinction is made between consumption of resources for seat 317, seat 320, and seat 326, which are sourced through different licenses, i.e., the first license 305 for seats 317 and 320 and the second license 307 for seat 326. In addition, the example of seat-assignment based consumption tracking illustrated in FIG. 3 does not enable multiple deployments of the resource proxy 332 per tenant 301.

Figure 4:
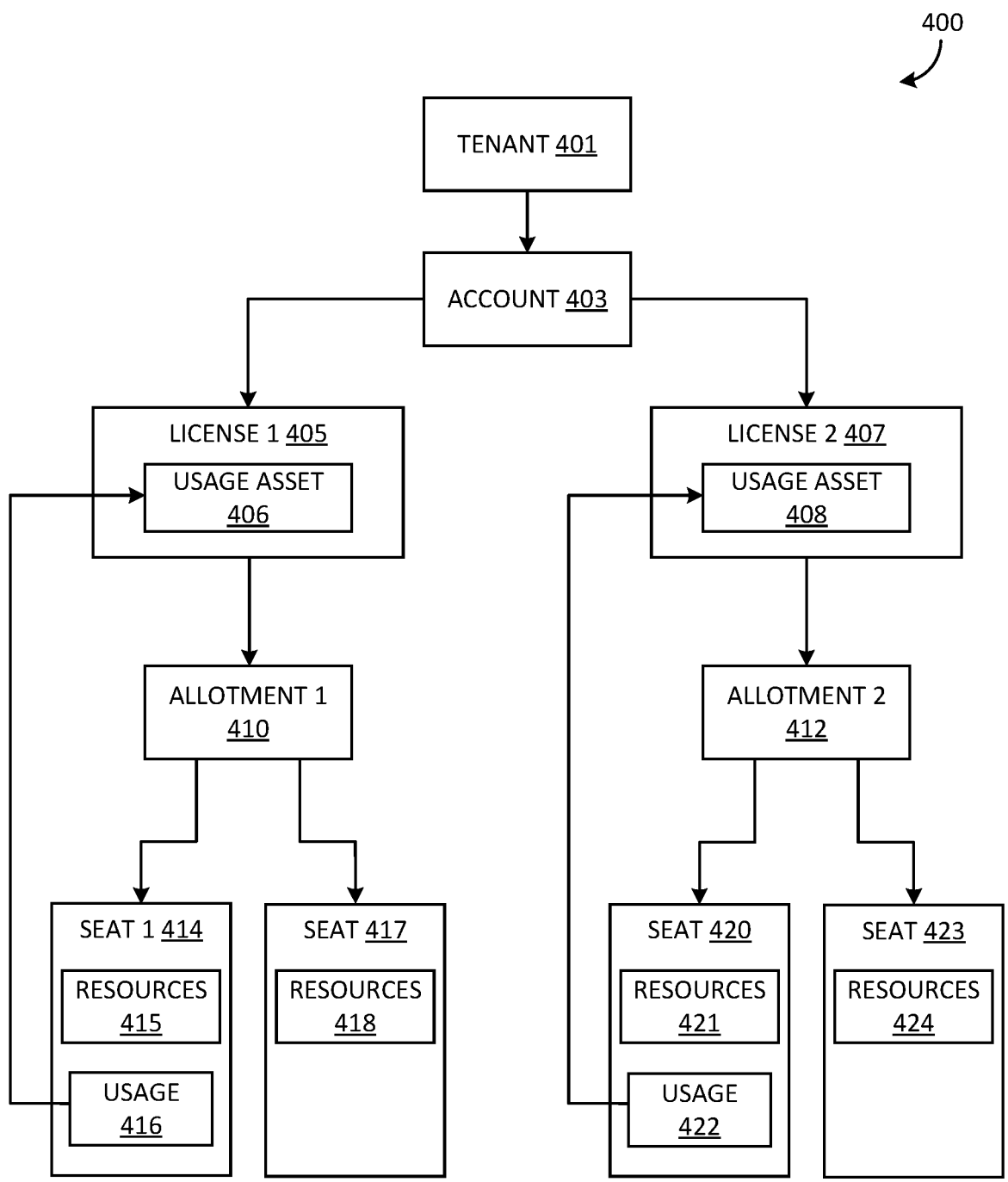
FIG. 4 is a block diagram illustrating an example architecture for seat-assignment based resource tracking for implementing various examples of the present disclosure.

FIG. 4 is yet another block diagram illustrating an example architecture for seat-assignment based resource tracking for implementing various examples of the present disclosure. The block diagram 400 is for illustration only and should not be construed as limiting. In some implementations, one or more components of the block diagram 400 include one or more components of the system 200.

The block diagram 400 illustrates another example of seat-assignment based consumption tracking according to various examples. In some implementations, the block diagram 400 is an example of provisioning specific workloads regarding a suite of services, such as in a corporate organization.

The block diagram 400 includes a tenant 401. In some implementations, the tenant 401 is the tenant 301. The tenant 401 includes a system or a computing device upon which a resource or a suite of resources is housed. For example, the tenant 401 may be a server or group of servers that stores the resources, information regarding licenses provided for access to the resources, and so forth. In some examples, the tenant 401 illustrated in the block diagram 400 represents an individual or organization that owns the rights to the resources and grants a license to another individual or organization to access the resources in exchange for payment. Payment may be made to the tenant 401 based on consumption of the resources, based on access to the resource, and so forth.

The block diagram 400 further includes an account 403. In some examples, the account 403 is an example of the account 219 and/or the account 303. The account 403 may be a subscription account for a subscription to the resources, or services, owned by the tenant 401. The account 403 is owned or operated by an individual or an organization that receives a license to access the resources owned and/or licensed by the tenant 401. The account 403 may include one or more licenses, such as the first license 405 and the second license 407. Each of the first license 405 and the second license 407 may be examples of the license 221. In some implementations, the first license 405 and the second license 407 include licenses to the same resources owned by the tenant 401. For example, a particular license may include a cap on the number of users, seats, etc. that may access the resources included in the license, so an organization may require more than one license for the entire organization. As another example, for billing, accounting, resource tracking, and so forth, an organization may choose to purchase more than one license to be used to access the resources.

In other implementations, the first license 405 includes a license to resources owned by the tenant 401 that the second license 407 does not include and/or the second license 407 includes a license to resources owned by the tenant 401 that the first license 405 does not include. For example, the organization may include different licenses that include different selections of resources. The organization may include an accounting department, which receives the first license 405, which includes a suite of resources that include accounting software, and a legal department, which receives the second license 407, which includes a suite of resources that include legal research software.

Each of the first license 405 and the second license 407 include a usage asset. For example, the first license 405 includes a usage asset 406 and the second license 407 includes a usage asset 408. The usage assets 406, 408 track consumption, or usage, of resources included in the first license 405 and the second license 407, respectively, by one or more seats included in the allotments, described in greater detail below.

Each of the first license 405 and the second license 407 include at least one allotment. For example, the first license 405 includes a first allotment 410 and the second license 407 includes a second allotment 412. The allotments 410, 412 may be examples of the allotments 222. Although each of the first license 405 and the second license 407 are illustrated in FIG. 4 as including one allotment, various examples are possible. Each of the first license 405 and the second license 407 may include one allotment or more than one allotment without departing from the scope of the present disclosure.

At the time the allotments 410, 412 are generated, the allotments 410, 412 are populated with one or more seats 414, 417, 420, 423, which are used to access and usage the resources of the account according to assigned security principles. Each of the seats 414, 417, 420, 423 may be an example of the seat 226 described herein. The security principles include which users and/or devices are authorized to access which resources of the respective license 405, 407. For example, within the first allotment 410, the first seat 414 and the second seat 417 may have access to different resources within the first license 405, different authorized consumption levels of the resources within the first license 405, and so forth.

In some implementations, the first allotment 410 is associated with a first organizational department and the seats are users, such as employees, of the resources within the department. For example, the first allotment 413 includes a first seat 414 and a second seat 417. The first seat 414 may be a first user in the first department and the second seat 417 may be a second user in the first department. Likewise, the second allotment 412 is associated with a second organizational department and the seats are users, such as employees, of the resources with the second department. The second organizational department may be a different department than the first organizational department within the same organization. The second allotment 412 includes a third seat 420 and a fourth seat 423. The third seat 420 may be a first user in the second department and the fourth seat 423 may be a second user in the second department. It should be understood that a user may be an employee, an independent contractor, a student, a device, or any other person or device authorized to utilize the resources under the respective license. Further, a department in an organization may also refer to a department, a group of departments, a class, or a group of classes within an educational system as described herein.

As each seat within an allotment accesses and utilizes the resources, consumption of the resources is tracked. For example, the first seat 414 accesses a version of the resource 415 and usage 416 is tracked and reported to the usage asset 406, the second seat 417 accesses a version of the resource 418, the third seat 420 accesses a version of the resource 421 and usage 422 is tracked and reported to the usage asset 408, and the fourth seat 423 accesses a version of the resource 424. In some examples, each version of the resource is a locally installed version of the resource that is accessible based on registration of a valid license. In other examples, each version of the resource is a cloud-based version of the resource that is accessible based on registration of a valid license.

As shown in the block diagram 400, the second seat 417 and the fourth seat 423 have access to a version of the resource 418 and resource 421, respectively, but do not report usage data to a usage asset. In some examples, this is because although the resources are available, the resources are not accessed and therefore no usage is present to be tracked.

The architecture illustrated in the block diagram 400 enables the separation of charges between the first license 405 and the second license 407, even in examples where each of the first license 405 and the second license 407 include access to the same resources. For example, it should be understood that the usage of the resources for a seat within a particular allotment 410, 412 is tracked by a usage asset 406, 408 of the license 405, 407 under which the particular allotment 410, 412 is generated. In other words, the usage 416 is tracked by the usage asset 406 of the first license 405, under which the first allotment 410 was generated. Likewise, the usage 422 is tracked by the usage asset 408 of the second license 407, under which the second allotment 412 was generated. By tracking consumption of the resources within a particular allotment in terms of a seat consuming the resources, the account 403 more accurately tracks what seat is accessing the resources and which allotment 410, 412 the seat is authorized within. From an identification of the allotment 410, 412, data charges derived from the usage of the resource are properly pushed to the appropriate license.

For example, as described herein, each of the first license 405 and the second license 407 may include a predetermined allocation of resource availability. By more accurately tracking the consumption of resources by the seat assignment within an allotment, the resource usage tracker 232 more precisely determines the consumption of resources and the license manager 220 gains a more precise understanding of usage trends of the resources. In some implementations, the account manager 218 manages payment for the resources consumed within each allotment 410, 412. By more accurately tracking the consumption of resources by the seat assignment within an allotment, the account manager 218 ensures charges are identified correctly in a particular bill for the account 403. This prevents additional payments being made on the account 403 or underpaying on a bill for the account 403, while also providing a mechanism for charges incurred by each of the first license 405 and the second license 407 to be billed separately for more precise accounting.

The separation of the allotments 410, 412 for the licenses 405, 407 provides improved manageability of the resources and the licenses 405, 407. For example, when a seat is added, removed, or modified within an allotment 410, 412, the charges automatically follow the change within the allotment. When a seat is added, or populated, to the first allotment 410, the seat is automatically authorized to incur charges by accessing the resources due to its status as populated within the first allotment 410. When a seat is removed from the first allotment 410, the seat is immediately blocked, or deauthorized, from accessing the resources and incurring charges due to its status as not populated within the first allotment 410. When the permissions of a particular seat within the first allotment 410 are modified by adding a resource to the seat, the resource is immediately available to the seat and charges may be incurred. When the permissions of a particular seat within the first allotment 410 are modified by removing a resource from the seat, the resource is immediately unavailable to the seat, disabling consumption of the resource, and charges may not be incurred. It should be understood that the description herein of modifying a seat within the first allotment 410 are for illustration only and the same additions, removals, and modifications may be made within the second allotment 412 without departing from the scope of the present disclosure.

Accordingly, the architecture of the block diagram 400 may be implemented by the system 200 to provide and/or remove accesses to resources included in a license 221. For example, the account manager 218 may acquire one or more licenses 221, i.e., the first license 405 and the second license 407, to a suite of resources. The license manager 220 generates the first allotment 410 and the second allotment 412 under the license 221. The license manager 220 populates the first allotment 410 and the second allotment 412 with one or more seats 226, either automatically or based on instructions received from the external device 228. As the seats 226 are populated within one of the first allotment 410 and the second allotment 412, benefits, i.e., access to the suite of resources, are enabled and accessible to the user or device associated with the seat. Where the seat is a user, the user may utilize one or more devices 230 to access the resources. As the device 230 access the resources, the consumption, or usage, is tracked and the consumption is billed to the respective license 405, 407 which the allotment 410, 412 of the seat is generated under. As the seat is removed from the allotment 410, 412, the access of the seat 226 is revoked and consumption is therefore no longer billed to the respective license.

Figure 5:
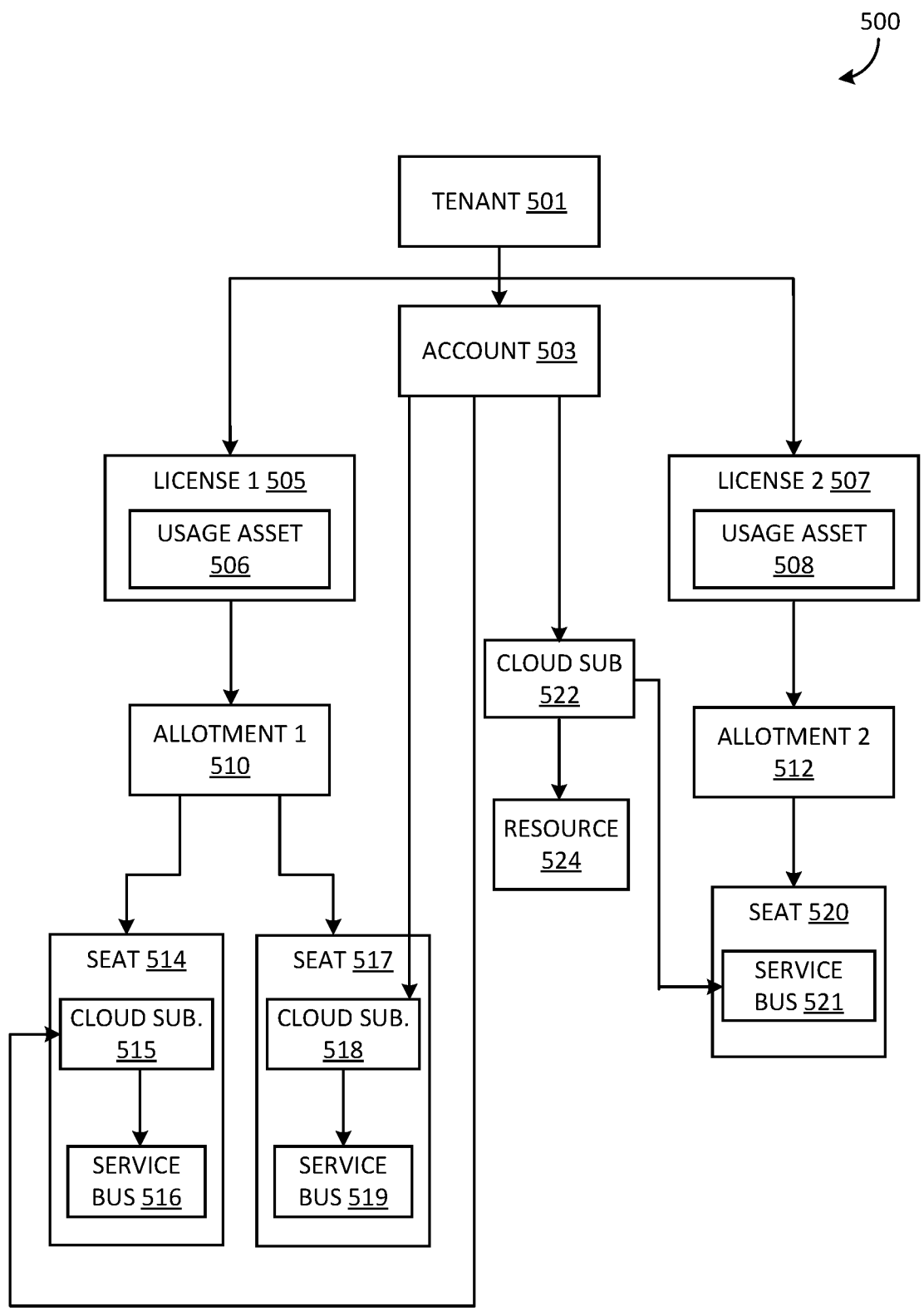
FIG. 5 is a block diagram illustrating another example architecture for seat-assignment based resource tracking for implementing various examples of the present disclosure.

FIG. 5 is a block diagram illustrating another example architecture for seat-assignment based resource tracking for implementing various examples of the present disclosure. The block diagram 500 is for illustration only and should not be construed as limiting. In some implementations, one or more components of the block diagram 500 include one or more components of the system 200.

The block diagram 500 illustrates another example of seat-assignment based consumption tracking according to various examples. In some implementations, the block diagram 500 is an example of provisioning specific workloads regarding educational resources, such as in an educational organization. For example, as shown in FIG. 5, the first license 505 and the second license 507 are provisioned at the tenant level, rather than at the account level. As described herein, each of the first license 505 and the second license 507 may represent a different class in an educational environment.

The block diagram 500 includes a tenant 501. In some implementations, the tenant 501 is the tenant 301 or the tenant 401. The tenant 501 includes a system or a computing device upon which a resource or a suite of resources is housed. For example, the tenant 501 may be a server or group of servers that stores the resources, information regarding licenses provided for access to the resources, and so forth. In some examples, the tenant 501 illustrated in the block diagram 500 represents an individual or organization that owns the rights to the resources and grants a license to another individual or organization to access the resources in exchange for payment. Payment may be made to the tenant 501 based on consumption of the resources, based on access to the resource, and so forth.

The block diagram 500 further includes an account 503. In some examples, the account 503 is an example of the account 219, the account 303, and/or the account 403. The account 503 may be a subscription account for a subscription to the resources, or services, owned and/or licensed by the tenant 501. The account 503 is owned or operated by an individual or an organization that receives a license to access the resources owned by the tenant 501.

The block diagram 500 further includes one or more licenses, such as the first license 505 and the second license 507. Each of the first license 505 and the second license 507 may be examples of the license 221. In some implementations, the first license 505 and the second license 507 include licenses to the same resources owned by the tenant 501. For example, a particular license may include a cap on the number of users, seats, etc. that may access the resources included in the license, so an organization may require more than one license for the entire organization. As another example, for billing, accounting, resource tracking, and so forth, an organization may choose to purchase more than one license to be used to access the resources.

In other implementations, the first license 505 includes a license to resources that the second license 507 does not include and/or the second license 507 includes a license to resources that the first license 505 does not include. For example, the educational organization may include different licenses that include different selections of resources. The organization may be an educational organization and each license 505, 507 may correspond to a separate class. Due to the different requirements of different classes, the licenses 505, 507 include different resources. For example, the first license 505 may include a license to class materials for a first class and the second license 507 may include a license to class materials for a second class.

Each of the first license 505 and the second license 507 include a usage asset. For example, the first license 505 includes a usage asset 506 and the second license 507 includes a usage asset 508. The usage assets 506, 508 track consumption, or usage, of resources included in the first license 505 and the second license 507, respectively, by one or more seats included in the allotments, described in greater detail below.

Each of the first license 505 and the second license 507 include at least one allotment. For example, the first license 505 includes a first allotment 510 and the second license 507 includes a second allotment 512. The allotments 510, 512 may be examples of the allotments 222. Although each of the first license 505 and the second license 507 are illustrated in FIG. 5 as including one allotment, various examples are possible. Each of the first license 505 and the second license 507 may include one allotment or more than one allotment without departing from the scope of the present disclosure.

At the time the allotments 510, 512 are generated, the allotments 510, 512 are populated with one or more seats 514, 517, 520, which are used to access and usage the resources of the account according to assigned security principles. Each of the seats 514, 517, 520 may be an example of the seat 226 described herein. For example, the security principles include which users and/or devices are authorized to access which resources of the respective license 505, 507. For example, within the first allotment 510, the first seat 514 and the second seat 517 may have access to different resources within the first license 505 than the third seat 520 within the second license 507.

As shown in FIG. 5, under the first license 505, an assignment provisions and provides access to a cloud subscription with a service bus. For example, the seat 514 receives access to the cloud subscription 515 through the service bus 516 and the seat 517 receives access to the cloud subscription 518 through the service bus 519. In contrast, under the second license 507, an assignment provisions and provides access to a service bus but not the subscription in which the service bus in contained. For example, the seat 520 receives access to the service bus 521, which provides access to the resource(s) 524 via the cloud subscription 522. No difference is seen for a user of the resources under the subscription, but the second license 507 may enable a different cost management experience for the account 503 and/or the tenant 501 by moving cloud subscriptions to a different area of an invoice at the billing process but maintaining individual resources at a service bus.

For example, the resources may include class materials for a semester, a quarter, a term, or an entire school year. Upon or just prior to the beginning of a new class beginning, the license manager 220 may generate the first allotment 510 for a first class and the second allotment 512 for a second class. The license manager 220 populates the first allotment 510 and the second allotment 512 with one or more seats 226, either automatically or based on instructions received from the external device 228. For example, the professor or instructor of each class may provide inputs via the external device 228 selecting students, which are enrolled in a class, to be populated within the allotment 510, 512 corresponding to the class in which they are enrolled. As the seats 226 are populated within one of the first allotment 510 and the second allotment 512, benefits, i.e., access to the suite of resources, are enabled and accessible to the user or device associated with the seat. Where the seat is a user, the user may utilize one or more devices 230 to access the resources. As the device 230 access the resources, the consumption, or usage, is tracked and the consumption is billed to the respective license 505, 507 which the allotment 510, 512 of the seat is generated under. For example, the seat 226 may retain access to the resources and be included in the allotment for the duration of the course. As the seat is removed from the allotment 510, 512, the access of the seat 226 is revoked and consumption is therefore no longer billed to the respective license. For example, the seat may be removed from the allotment 510, 512 at the conclusion of the course, after the student associated with seat 226 withdraws from the course, and so forth.

Figure 6:
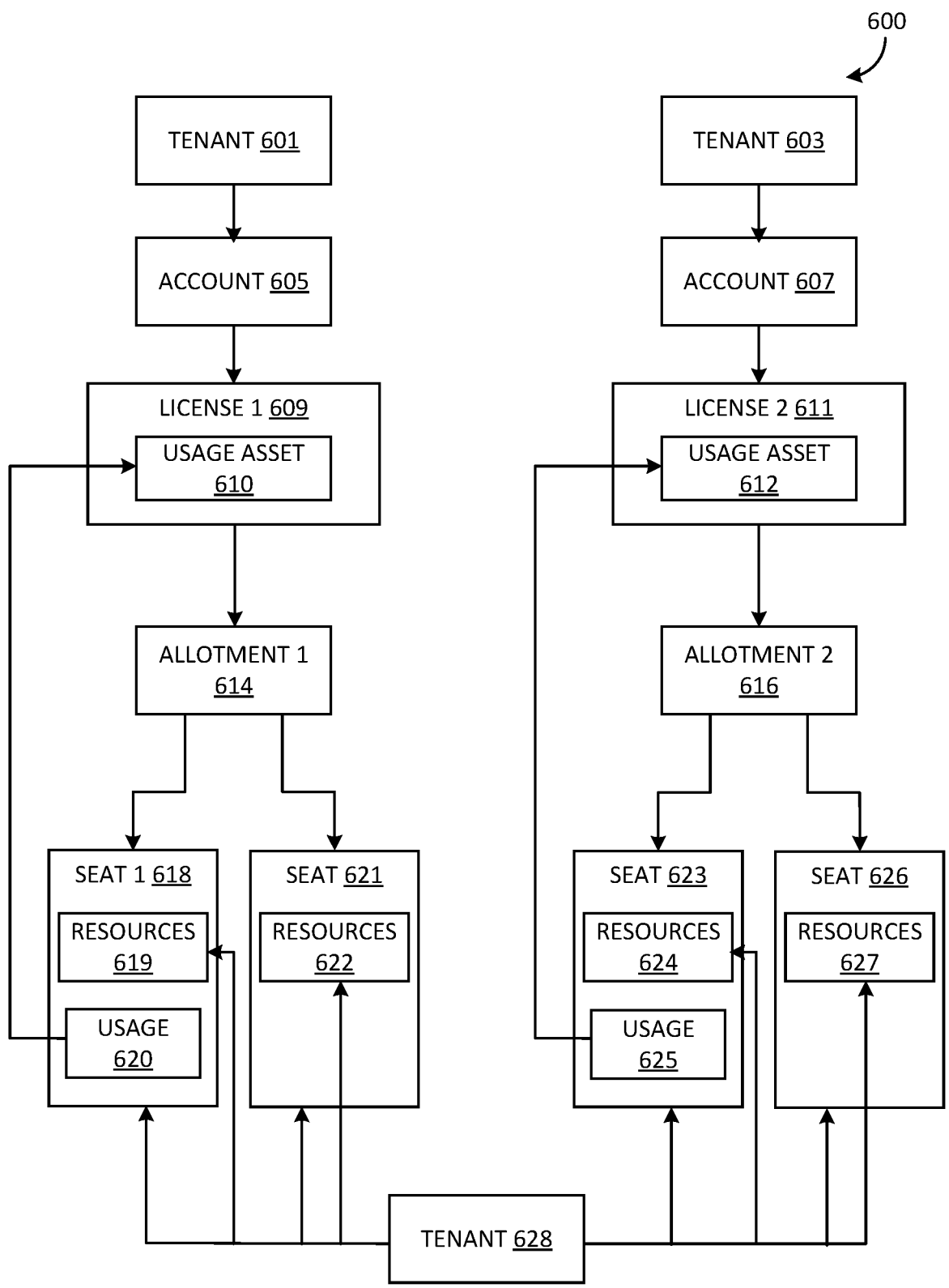
FIG. 6 is a block diagram illustrating another example architecture for seat-assignment based resource tracking for implementing various examples of the present disclosure.

FIG. 6 is a block diagram illustrating another example architecture for seat-assignment based resource tracking for implementing various examples of the present disclosure. The block diagram 600 is for illustration only and should not be construed as limiting. In some implementations, one or more components of the block diagram 600 include one or more components of the system 200.

The block diagram 600 illustrates another example of seat-assignment based consumption tracking according to various examples. For example, the block diagram 600 illustrates an example where an organization works across multiple tenants, such as the first tenant 601, the second tenant 603, and/or the third tenant 628. The organization may have a tenant that manages the billing, such as the third tenant 628, and separate tenants where workloads are accessed and managed, such as the first tenant 601 and the second tenant 603. In some examples, the third tenant 628 manages billing by acquiring licenses, performing cost management operations, and so forth.

As shown in the block diagram 600, a first account 605 acquires a first license 609 with resources on behalf of a first tenant 601, while a second account 607 acquires a second license 611 with resources on behalf of a second tenant 603. The first tenant 601, the second tenant 603, and the third tenant each may be the tenant 301, the tenant 401, and the tenant 501.

Each of the first license 609 and the second license 611 include a usage asset. For example, the first license 609 includes a usage asset 610 and the second license 611 includes a usage asset 612. The usage assets 610, 612 track consumption, or usage, of resources included in the first license 609 and the second license 611, respectively, by one or more seats included in the allotments, described in greater detail below.

Each of the first license 609 and the second license 611 include at least one allotment. For example, the first license 609 includes a first allotment 614 and the second license 611 includes a second allotment 616. The allotments 614, 616 may be examples of the allotments 222. Although each of the first license 609 and the second license 611 are illustrated in FIG. 6 as including one allotment, various examples are possible. Each of the first license 609 and the second license 611 may include one allotment or more than one allotment without departing from the scope of the present disclosure.

At the time the allotments 614, 616 are generated, the allotments 614, 616 are populated with one or more seats 618, 621, 623, 626, which are used to access and usage the resources of the account according to assigned security principles. Each of the seats 618, 621, 623, 626 may be an example of the seat 226 described herein. For example, the security principles include which users and/or devices are authorized to access which resources of the respective license 609, 611. For example, within the first allotment 614, the first seat 618 and the second seat 621 may have access to different resources within the first license 609 than the third seat 623 and the fourth seat 626 within the second license 611.

As each seat within an allotment accesses and utilizes the resources, consumption of the resources is tracked. For example, the first seat 618 accesses a version of the resource 619 and usage 620 is tracked and reported to the usage asset 610, the second seat 621 accesses a version of the resource 622, the third seat 623 accesses a version of the resource 624 and usage 625 is tracked and reported to the usage asset 612, and the fourth seat 626 accesses a version of the resource 627. In some examples, each version of the resource is a locally installed version of the resource that is accessible based on registration of a valid license. In other examples, each version of the resource is a cloud-based version of the resource that is accessible based on registration of a valid license.

As shown in the block diagram 600, the second seat 621 and the fourth seat 626 have access to a version of the resource 622 and resource 627, respectively, but do not report usage data to a usage asset. In some examples, this is because although the resources are available, the resources are not accessed and therefore no usage is present to be tracked.

An organization may work with one or more cloud solution providers. The cloud solution providers acquire licenses, but the seats and workloads are deployed in a customer's tenant where they are assigned & used. Consumption by a seat may be tracked and/or billed to the appropriate cloud solution provider which acquired the license for the respective seat. For example, the first seat 618, the second seat 621, and their respective resources 619, 622 may be obtained for use and consumption by a first department, such as a marketing department, while the third seat 623, the fourth seat 626, and their respective resources 624, 627 may be obtained for use and consumption by a second department, such as a research and development department. As shown in the block diagram 600, the consumption of resources by a particular license may be tracked and/or billed through the respective account to the respective tenant.

Figure 7:
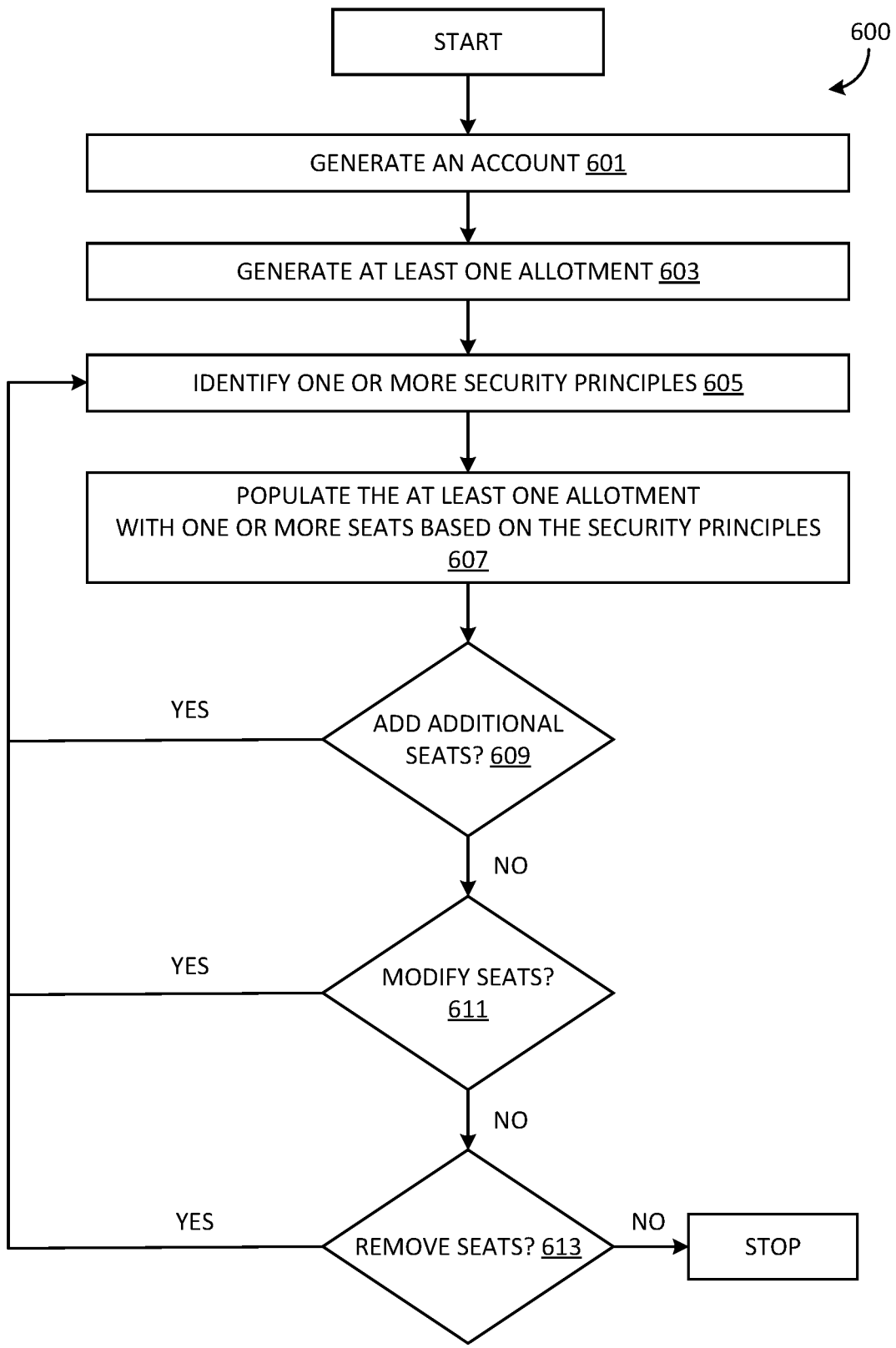
FIG. 7 is a flow chart illustrating a computer-implemented method for generating and populating an allotment according to various examples of the present disclosure.

FIG. 7 is a flow chart illustrating a computer-implemented method for generating and populating an allotment according to various examples of the present disclosure. The operations illustrated in FIG. 7 are for illustration and should not be construed as limiting. Various examples of the operations may be used without departing from the scope of the present disclosure. The operations of the flow chart 700 may be executed by one or more components of the system 200, including the processor 208, the account manager 218, the license manager 220, and the seat manager 224.

The flow chart 700 begins with the account manager 218 generating at least one account 219 in operation 701. Generating the at least one account 219 may include registering with a provider, such as one of the tenants 301, 401, 501, of a suite of services. As described herein, the account 219 may include one or more licenses 221 for a subscription to the suite of services. In operation 703, the license manager 220 generates at least one allotment 222. The at least one allotment 222 may refer to a department within an organization, a class within an educational department, and so forth.

In operation 705, the license manager 220 identifies one or more security principles associated with the at least one allotment 222. The security principles include information regarding authorizations of the at least one allotment 222. For example, which users are authorized to access the resources included in the at least one allotment 222, which users are not authorized to access the resources included in the at least one allotment 222, and so forth. In some implementations, the security principles are dependent upon the at least one allotment 222. For example, the at least one allotment 222 may include access to some resources and not include access to other resources due to security concerns or cost. In some implementations, the security principles are dependent upon the potential users to be included in the at least one allotment 222. For example, some users may have heightened security privileges or job requirements that enable access to resources that other users may not receive access to. Conversely, some users may have lower security privileges or job requirements that restrict access to resources that other users may receive access to.

It should be understood that some allotments 222 within a same account 219 may have different security principles. For example, in the block diagram 400, the first allotment 410 may have different security principles than the second allotment 412. In this example, the license manager 220 identifies the security principles for each allotment 222 separately.

In operation 707, the license manager 220 populates the at least one allotment 222 with one or more seats 226 based on the identified security principles. By populating the at least one allotment 222 with one or more seats 226, each of the one or more seats 226 are automatically authorized to access at least a portion of the resources included in the authorization of the at least one allotment 222. In examples where each seat 226 is identified to have standard security principles for the at least one allotment 222, the license manager 220 populates each seat 226 according to the security principles, which automatically authorizes each seat 226 to access a full suite of resources included for the particular allotment 222. In examples where one or more seats 226 are identified to have security principles that deviate from the standard security principles, the identified one or more seats 226 are populated and the access to the resources of the at least one allotment 222 is determined according to their specific security principles, while the remaining seats 226 are populated according to the standard security principles for the at least one allotment 222.

In some examples, populating the at least one allotment 222 includes updating the table 215 with details regarding the newly added seats 226, including one or more devices 230 associated with each seat 226. In examples where the table 215 has not been previously generated, such as for a new allotment 222, populating the at least one allotment 222 includes generating the table 215.

In operation 709, the seat manager 224 determines whether any additional seats 226 are to be added to the at least one allotment 222. In some implementations, where the account 219 is a corporate account, an additional seat 226 may be added to the at least one allotment 222 based on a new user, corresponding to an additional seat 226, joining the department associated with the allotment 222. In some examples, where the account 219 is an educational account, an additional seat 226 may be added to the at least one allotment 222 based on a new student, corresponding to an additional seat 226, joining the class associated with the allotment 222. In examples where an additional seat 226 is to be added to the at least one allotment 222, the flow chart 700 returns to operation 705 and identifies one or more security principles for the additional seat 226. In examples where an additional seat 226 is not to be added to the at least one allotment 222, the flow chart 700 continues to operation 711. In some implementations, adding additional seats 226 to the allotment 222 includes updating the table 215.

In operation 711, the seat manager 224 determines whether any of the seats 226 currently assigned to the allotment 222 are to be modified. Modifying a seat 226 may include increasing security privileges to gain access to additional resources or decreasing security privileges to reduce access to previously accessible resources. In examples where one or more of the seats 226 is to be modified, the flow chart 700 returns to operation 705 and identifies one or more security principles for the seat 226 to be modified. In examples where none of the seats 226 are to be modified, the flow chart 700 continues to operation 713. In some implementations, modifying seats 226 in the allotment 222 includes updating the table 215.

In operation 713, the seat manager 224 determines whether any of the seats 226 are to be removed from the at least one allotment 222. Removing a seat 226 includes removing the seat 226 from the at least one allotment 222, which automatically removes the access of the seat 226 to the resources of the allotment 222. In other words, upon removing the seat 226 from the populated plurality of seats from the allotment 222, the seat 226 is automatically deauthorized from accessing the plurality of resources. A seat 226 may be removed from the allotment 222 when the user associated with the seat 226 is removed from or leaves the department associated with the allotment 222. For example, where the allotment 222 is for a class in an educational organization, the seat 226 may be removed from the allotment 222 upon the conclusion of the class and the resources are no longer needed. In some implementations, removing seats 226 from the allotment 222 includes updating the table 215.

It should be understood that although described herein as a sequence of steps, one or more operations of the flow chart 700 may be omitted, one or more operations may be added to the flow chart 700, and/or one or more operations may be performed in a different order. In particular, operations 709, 711, and 713 may be performed in any order. In some implementations, operations 709, 711, and 713 are repeated at regular intervals throughout the life of an allotment 222 in order to maintain an updated version of the allotment 222 and table 215.

Figure 8:
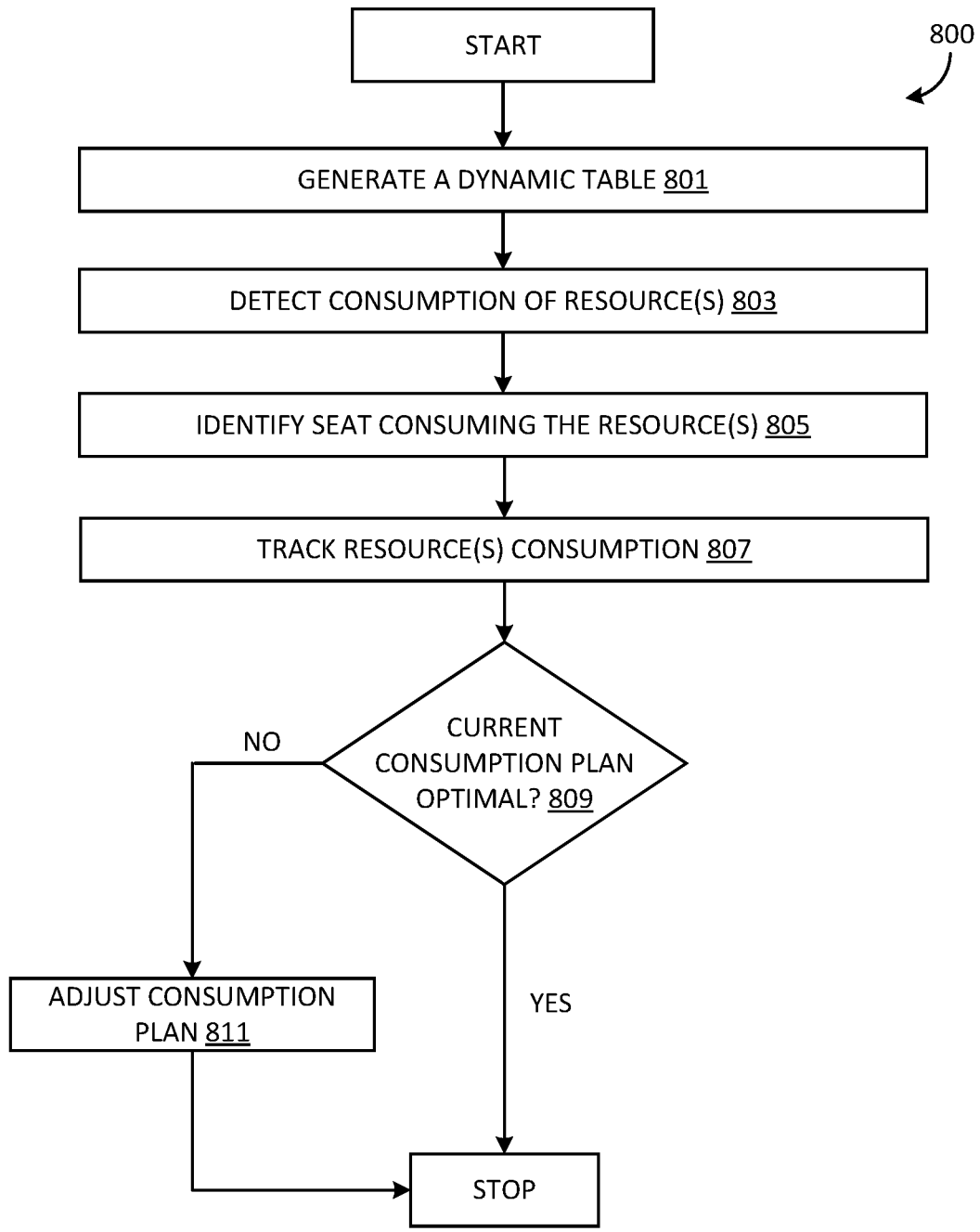
FIG. 8 is a flow chart illustrating a computer-implemented method for tracking the consumption of resources according to various examples of the present disclosure.

FIG. 8 is a flow chart illustrating a computer-implemented method for tracking the consumption of resources according to various examples of the present disclosure. The operations illustrated in FIG. 8 are for illustration and should not be construed as limiting. Various examples of the operations may be used without departing from the scope of the present disclosure. The operations of the flow chart 800 may be executed by one or more components of the system 200, including the processor 208, the account manager 218, the license manager 220, the seat manager 224, and the resource usage tracker 232.

The flow chart 800 begins by the license manager 220 generating the table 215 for an allotment 222 in operation 801. In some implementations, the table 215 is generated by the license manager 220 as part of populating of the allotment 222 with one or more seats 226. The table 215 includes information associating, or mapping, one or more devices 230 registered to a particular seat 226 within the allotment 222. For example, as illustrated in FIG. 2, the table 215 maps the device A 230a to seat A 226a, device B 230b to seat B 226b, and device N 230n to seat N 226n. It should be understood that the table 215 is dynamic and may be regularly updated to include new devices 230 associated with various seats 226 as new devices are added to a profile of the seat, to remove devices 230 associated with various seats 226 as the device 230 is logged out of one or more resources, and so forth.

In operation 803, the resource usage tracker 232 detects the consumption of a resource included within the license 221. In some examples, consumption is detected when one of the resources within the license 221 is accessed. For example, one of the devices 230 receives a log in, for example using a username and password associated with the seat 226 or through another authentication means, and upon the log in, consumption is detected. In some implementations, the resource usage tracker 232 continually monitors the resources for activity to be tracked. In other implementations, a log in being received on one of the resources triggers an alert to be sent to the resource usage tracker 232 to begin tracking consumption of the resource.

In operation 805, the resource usage tracker 232 identifies a seat 226 consuming the resource. In some implementations, when the device 230 logs in to the resource, the resource usage tracker 232 identifies the IP address of the device 230 which has logged in and maps the seat 226 to the identified IP address within the table 215. In other implementations, when the device 230 logs in to the resource, the resource usage tracker 232 identifies the seat 226 based on the authentication credentials provided to log in.

In operation 807, the resource usage tracker 232 tracks the consumption of the resource by the device 230 associated with the seat 226. The consumption may be tracked through one or more of various methods. In examples where the resource includes an aspect of storage capacity, the consumption may be measured by the size of the storage capacity that is utilized. In other examples, consumption may be tracked by an amount of time spent utilizing the resource, an amount of the resource downloaded, a number of incoming/outgoing minutes in a phone call, a number of text messages sent/received, number of email rules created by a user, and so forth. In some implementations, the tracked resource consumption is reported to the license manager 220 and/or the account manager 218. In some implementations, the tracked consumption is subtracted from a predetermined allocation of resource availability, which, when fully consumed, results in additional charges in order to continue accessing the resources of the allotment 222.

In operation 809, the account manager 218 determines whether a current consumption plan for the seats 226 is optimal based on the tracked resource consumption. For example, based on consumption of the resources, the account manager 218 may generate a bill to be paid based on the consumed resources. Various plans may be available to pay for consumption. For example, consumption may be paid for as it is used, such as per hour or per amount of storage utilized, consumption may be paid for with a one-time fee for a predetermined amount of consumption, or a combination of the two. Various examples are possible.

To determine whether the current consumption plan is optimal, the account manager 218 compares usage of the license, including one or more seats 226 in the allotment 222, to the current consumption plan. A current consumption plan may be considered to be optimal if the usage correlates with the plan and the price paid for the consumption. For example, where the allotment 222 incurs only occasional consumption and a consumption plan bills for the charges by the hour, the plan may be optimal. However, where the allotment 222 incurs significant consumption and a consumption plan bills for the charges by the hour, but an alternative plan enables the payment of a one-time fee for a greater amount of consumption, the plan may be determined not to be optimal because cost savings could be had by switching to the one-time fee plan. In another example, where the allotment 222 incurs only occasional consumption and a consumption plan includes a one-time fee for a greater amount of consumption, the plan may be determined not to be optimal because significant cost savings could be had by switching to an hourly-based plan.

Where the current plan is determined not to be optimal, the flow chart 800 terminates. Where the current plan is determined not to be optimal, the flow chart 800 proceeds to operation 811 and adjusts the consumption plan to a plan that is more optimal based on the incurred consumption. Following the adjustment to the consumption plan, the flow chart 800 terminates.

Figure 9:
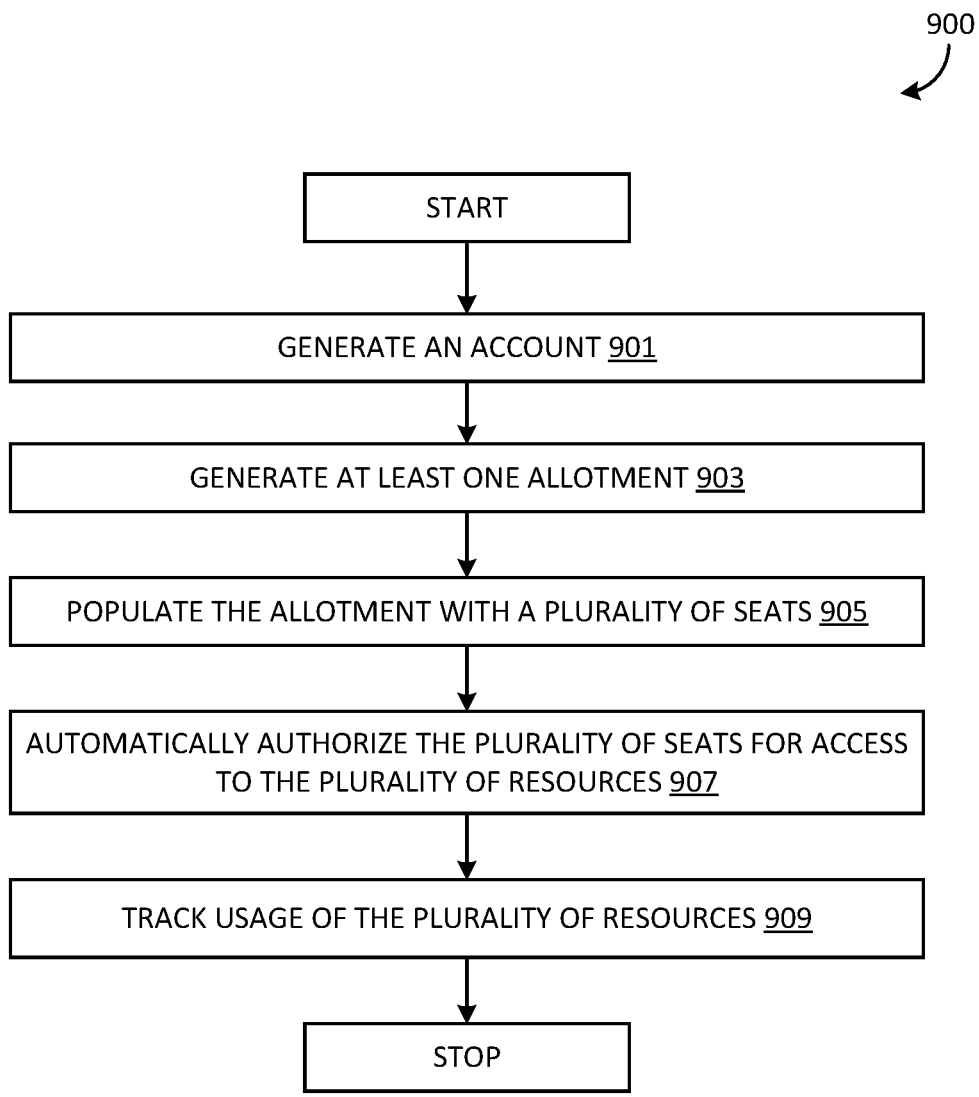
FIG. 9 is a flow chart illustrating a computer-implemented method for an example of seat-assignment based resource tracking for implementing various examples of the present disclosure.

FIG. 9 is a flow chart illustrating a computer-implemented method for an example of seat-assignment based resource tracking for implementing various examples of the present disclosure. The operations illustrated in FIG. 9 are for illustration and should not be construed as limiting. Various examples of the operations may be used without departing from the scope of the present disclosure. The operations of the flow chart 900 may be executed by one or more components of the system 200, including the processor 208, the account manager 218, the license manager 220, the seat manager 224, and the resource usage tracker 232.

The flow chart 900 begins by the account manager 218 generating an account 219 in operation 901. Generating the account 219 may include registering with a provider of a suite of services. The account 219 may include one or more licenses 221 for a plurality of resources. In operation 903, the license manager 220 generates at least one allotment 222 under the account 219. The at least one allotment 222 may refer to different departments within an organization, different classes within an educational department, and so forth. In operation 905, the license manager 220 populates the allotment with a plurality of seats 226, which causes the plurality of seats to be automatically authorized to access at least a portion of the plurality of resources in operation 907. In operation 909, the resource usage tracker 232 tracks the usage, or consumption, of the plurality of resources by one or more devices 230 associated with the one or more seats 226 of the authorized plurality of seats.

Additional Examples

Some examples herein are directed to a computer-implemented method of resource tracking, as illustrated by the flow chart 900. The method (900) includes generating (901) an account (219), the account including a license (221) for a plurality of resources, generating (903) at least one allotment (222) under the account, populating (905) the allotment with a plurality of seats (226), automatically authorizing (907) the populated plurality of seats for access to a portion of the plurality of resources, and, in response to the portion of the plurality of resources being accessed by a device (230) associated with a seat of the authorized plurality of seats, tracking (909) usage of the plurality of resources by the device.

In some examples, the method further comprises removing the seat of the populated plurality of seats from the allotment; and upon removing the seat from the populated plurality of seats from the allotment, automatically deauthorizing the seat from accessing the plurality of resources.

In some examples, the method further comprises associating the device with the authorized seat upon registering the device with the authorized seat and the device activating the license; and storing the association within a table (215).

In some examples, the method further comprises increasing the portion of the plurality of resources the seat is authorized to access.

In some examples, the method further comprises authorizing a second seat of the populated plurality of seats for access to a second portion of the plurality of resources, wherein the second portion of the plurality of resources is smaller than the portion of the plurality of resources.

In some examples, the at least one allotment includes the allotment and a second allotment and the method further comprises populating the second allotment with a second plurality of seats, different than the plurality of seats, and authorizing the second plurality of seats with a second portion of resources different than the plurality of resources.

In some examples, the method further comprises tracking consumption of the plurality of resources by the device, and subtracting the tracked consumption from a predetermined allocation of resource availability.

Although described in connection with an example computing device 100 and system 200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A system for computational resource tracking, the system comprising:
   a processor,
   a memory storing instructions that are executed by the processor;
   an account manager, implemented on the processor, configured to generate an account, the account including a license for a plurality of computational resources;
   a license manager, implemented on the processor, configured to:
      generate an allotment of the computational resources under the license of the account;
      in response to generating the allotment, populate the allotment of the computational resources with a plurality of seats, the plurality of seats being a selection of individuals or devices for whom usage of the plurality of computational resources is authorized;
      in response to populating the allotment, store an identifier of an individual or a device, and a seat of the plurality of seats within a dynamic table stored in the memory, thereby representing an association between the individual or the device, and that seat;
      based on an addition or a removal of a seat of the populated plurality of seats from the allotment, automatically control authorization and deauthorization of that seat to access a portion of the plurality of computational resources under the license of the account;
      update the dynamic table in real-time based on:
         a seat of the populated plurality of seats being added to, removed from, or modified within the allotment, and
         an individual or a device, being added to, removed from, or modified within the allotment;
   a resource usage tracker, implemented on the processor, configured to:
      based on the portion of the plurality of computational resources under the license of the account being accessed by an individual or device associated with an authorized seat, track usage of the plurality of computational resources by the individual or device;
      in response to tracking usage of the plurality of computational resources by the individual or device, identify the authorized seat associated with the identifier of the individual or the device in the dynamic table;
      in response to identify the authorized seat, tag the tracked usage of the plurality of computational resources as usage by the identified seat; and
      in response to tagging the tracked usage of the plurality of computational resources as usage by the identified seat, report the tracked usage of the plurality of computational resources by the identified seat to a usage asset of the license.

2. The system of claim 1, wherein:
   the license further comprises a first license and a second license for the plurality of computational resources;
   the allotment further comprises a first allotment and a second allotment of computational resources under the first license and the second license of the account respectively,
   the plurality of seats further comprises a first plurality of seats and a second plurality of seats of the first allotment and the second allotment respectively; and
   the usage asset further comprises a first usage asset and a second usage asset of the first license and the second license respectively.

3. The system of claim 2, wherein the license manager is further configured to:
   modify a seat in the allotment to:
      increase a security privilege to the seat, thereby causing that seat to gain access to additional computational resources, or
      decrease a security privilege to that seat, thereby causing that seat to reduce access to computational resources;
   receive, from an administrator, instructions to add or remove a seat of the populated plurality of seats from the allotment, wherein the administrator controls the account manager and the license manager; and
   based on removing that seat from the populated plurality of seats from the allotment, automatically deauthorize that seat from accessing the plurality of computational resources.

4. The system of claim 3, wherein the license manager stores the identifier of the individual, or the device, and the seat upon registering the device with the seat and the individual or the device activating the license.

5. The system of claim 4, further comprising:
   a first tenant and a second tenant housing the plurality of computational resources;
   wherein the account further comprises a first account and a second account, the first account and the second account including the first license and the second license for the plurality of computational resources from the first tenant and the second tenant respectively;
   wherein the portion of the plurality of computational resources further comprises a first portion and a second portion of the plurality of computational resources; and
   wherein the license manager is further configured to:
      authorize the second plurality of seats for access to the second portion of the plurality of computational resources, wherein the second portion of the plurality of computational resources is smaller than the first portion of the plurality of computational resources.

6. The system of claim 5, wherein:
   the plurality of computational resources are of the same type;
   the license manager further comprises the resource usage tracker; and
   the license manager is further configured to:
      identify a security principle associated with the allotment, the security principle including information regarding authorizations of the allotment,
      wherein the license manager populates the allotment of computational resources according to the identified security principle associated with that allotment.

7. The system of claim 6, wherein, to track the usage of the plurality of computational resources, the resource usage tracker is further configured to:
   subtract the tracked usage of the plurality of computational resources by the identified seat associated with the device from an allocation of resource availability;
   compare the tracked usage with the allocation of resource availability;
   report the tracked usage of the plurality of computational resources by the device to the account manager; and
   wherein the account manager is further configured to:
      based on the tracked usage exceeding the allocation, cause restrictions on the device for the plurality of computational resources or cause additional charges to the account, wherein the additional charges are associated with the seat of the device.

8. A method for computational resource tracking, the method comprising:
   generating an account, the account including a license for a plurality of computational resources;
   generating an allotment of computational resources under the license of the account;
   in response to generating the allotment, populating the allotment of computational resources with a plurality of seats, the plurality of seats being a selection of individuals or devices for whom usage of the plurality of computational resources is authorized;
   in response to populating the allotment, storing an identifier of an individual or a device, and a seat of the plurality of seats within a dynamic table, the identifier representing an association between the individual or the device, and that seat;
   based on an addition or a removal of a seat of the populated plurality of seats from the allotment, automatically controlling an authorization and deauthorization of that seat to access a portion of the plurality of computational resources under the license of the account;
   updating the dynamic table based on:
      a seat of the populated plurality of seats being added to, removed from, or modified within the allotment, and
      an individual or a device, being added to, removed from, or modified within the allotment;
      based on the portion of the plurality of computational resources under the license of the account being accessed by an individual or device associated with an authorized seat, tracking usage of the plurality of computational resources by the individual or device;
      in response to tracking usage of the plurality of computational resources by the individual or device, identifying the authorized seat associated with the identifier of the individual or the device in the dynamic table;
      in response to identify the authorized seat, tagging the tracked usage of the plurality of computational resources as usage by the identified seat; and
      in response to tagging the tracked usage of the plurality of computational resources as usage by the identified seat, reporting the tracked usage of the plurality of computational resources by the identified seat to a usage asset of the license.

9. The method of claim 8, wherein:
   the license further comprises a first license and a second license for the plurality of computational resources;
   the allotment further comprises a first allotment and a second allotment of computational resources under the first license and the second license of the account respectively,
   the plurality of seats further comprises a first plurality of seats and a second plurality of seats of the first allotment and the second allotment respectively; and
   the usage asset further comprises a first usage asset and a second usage asset of the first license and the second license respectively.

10. The method of claim 9, further comprising:
    modifying a seat in the allotment to:
       increase a security privilege to that seat, thereby causing that seat to gain access to additional computational resources, or
       decrease a security privilege to that seat, thereby causing that seat to reduce access to computational resources;
    receiving, from an administrator, instructions to add or remove a seat of the populated plurality of seats from the allotment; and
    based on removing that seat from the populated plurality of seats from the allotment, automatically deauthorizing that seat from accessing the plurality of computational resources.

11. The method of claim 10, wherein storing the identifier of the individual or the device and the seat is done based on registering the individual or the device with the seat and the individual or the device activating the license.

12. The method of claim 11, wherein a first tenant and a second tenant house the plurality of computational resources, wherein the portion of the plurality of computational resources further comprises a first portion and a second portion of the plurality of computational resources, and wherein the account is a first account, further comprising:
    generating a second account, the first account and the second account including the first license and the second license for the plurality of computational resources from the first tenant and the second tenant respectively; and
    authorizing the second plurality of seats for access to the second portion of the plurality of computational resources, wherein the second portion of the plurality of computational resources is smaller than the first portion of the plurality of computational resources.

13. The method of claim 12, wherein:
    the plurality of computational resources are of the same type; and
    the method further comprises:
       identifying a security principle associated with the allotment, the security principle including information regarding authorizations of the allotment,
       wherein the allotment of computational resources is populated according to the identified security principle associated with that allotment.

14. The method of claim 13, wherein tracking the usage of the plurality of computational resources further comprises:
    subtracting the tracked usage of the plurality of computational resources by the identified seat associated with the device from an allocation of resource availability;
    comparing the tracked usage with the allocation of resource availability;
    reporting the tracked usage of the plurality of computational resources by the device to an account manager; and
    further comprising based on the tracked usage exceeding the allocation, causing restrictions on the device for the plurality of computational resources or causing additional charges to the account, wherein the additional charges are associated with the seat of the device.

15. A computer-storage memory device embodied with executable instructions that, when executed by a processor, cause the processor to:
    generate an account, the account including a license for a plurality of computational resources;
    generate an allotment of computational resources under the license of the account;
    in response to generating the allotment, populate the allotment of computational resources with a plurality of seats, the plurality of seats being a selection of individuals or devices for whom usage of the plurality of computational resources is authorized;

in response to populating the allotment, store an identifier of an individual or a device, and a seat of the plurality of seats within a dynamic table stored in the memory, the identifier representing an association between the individual or the device, and that seat;

based on an addition or a removal of a seat of the populated plurality of seats from the allotment, automatically control an authorization and deauthorization of that seat to access a portion of the plurality of computational resources under the license of the account;

update the dynamic table based on:
 a seat of the populated plurality of seats being added to, removed from, or modified within the allotment, and
 an individual or a device, being added to, removed from, or modified within the allotment;

based on the portion of the plurality of computational resources under the license of the account being accessed by an individual or device associated with an authorized seat, track usage of the plurality of computational resources by the individual or device;

in response to tracking usage of the plurality of computational resources by the individual or device, identify the authorized seat associated with the identifier of the individual or the device in the dynamic table;

in response to identify the authorized seat, tag the tracked usage of the plurality of computational resources as usage by the identified seat; and in response to tagging the tracked usage of the plurality of computational resources as usage by the identified seat, report the tracked usage of the plurality of computational resources by the identified seat to a usage asset of the license.

16. The computer-storage memory device of claim 15, wherein:
 the license further comprises a first license and a second license for the plurality of computational resources;
 the allotment further comprises a first allotment and a second allotment of computational resources under the first license and the second license of the account respectively,
 the plurality of seats further comprises a first plurality of seats and a second plurality of seats of the first allotment and the second allotment respectively; and
 the usage asset further comprises a first usage asset and a second usage asset of the first license and the second license respectively.

17. The computer-storage memory device of claim 16, wherein the instructions further cause the processor to:
 modify a seat in the allotment to:
  increase a security privilege to that seat, thereby causing that seat to gain access to additional computational resources, or
  decrease a security privilege to that seat, thereby causing that seat to reduce access to computational resources;
 receive, from an administrator, instructions to add or remove a seat of the populated plurality of seats from the allotment; and
 based on removing that seat from the populated plurality of seats from the allotment, automatically deauthorize that seat from accessing the plurality of computational resources.

18. The computer-storage memory device of claim 17, wherein storing the identifier of the individual or the device and the seat is done based on registering the individual or the device with the seat and the individual or the device activating the license.

19. The computer-storage memory device of claim 18, wherein:
 the plurality of computational resources are of the same type; and
 the instructions further cause the processor to:
  identify a security principle associated with the allotment, the security principle including information regarding authorizations of the allotment,
  wherein the allotment of computational resources is populated according to the identified security principle associated with that allotment.

20. The computer-storage memory device of claim 19, wherein the instructions further cause the processor to:
 subtract the tracked usage of the plurality of computational resources by the identified seat associated with the device from a allocation of resource availability;
 compare the tracked usage with the allocation of resource availability;
 report the tracked usage of the plurality of computational resources by the device to an account manager; and
 based on the tracked usage exceeding the allocation, cause restrictions on the device for the plurality of computational resources or cause additional charges to the account, wherein the additional charges are associated with the seat of the device.

* * * * *